(12) United States Patent
Huang et al.

(10) Patent No.: US 6,865,528 B1
(45) Date of Patent: Mar. 8, 2005

(54) USE OF A UNIFIED LANGUAGE MODEL

(75) Inventors: Xuedong D. Huang, Woodinville, WA (US); Milind V. Mahajan, Redmond, WA (US); Ye-Yi Wang, Redmond, WA (US); Xiaolong Mou, Cambridge, MA (US)

(73) Assignee: Microsoft Corporation, Redmond, WA (US)

( * ) Notice: Subject to any disclaimer, the term of this patent is extended or adjusted under 35 U.S.C. 154(b) by 430 days.

(21) Appl. No.: 09/585,834

(22) Filed: Jun. 1, 2000

(51) Int. Cl.[7] .......................... G06F 17/27; G10L 15/18; G10L 11/00
(52) U.S. Cl. ........................ 704/9; 704/257; 704/275
(58) Field of Search .................. 704/1, 10, 2, 226, 704/231, 251, 255, 3, 9, 257, 275; 709/201, 203

(56) References Cited

U.S. PATENT DOCUMENTS

| | | | |
|---|---|---|---|
| 4,831,550 A | 5/1989 | Katz | 364/513.5 |
| 4,945,566 A | 7/1990 | Mergel et al. | 381/41 |
| 4,947,438 A | 8/1990 | Paeseler | 381/43 |
| 5,263,117 A | 11/1993 | Nadas et al. | 395/2 |
| 5,384,892 A | 1/1995 | Strong | 395/2.52 |
| 5,477,451 A | 12/1995 | Brown et al. | 364/419.08 |
| 5,502,774 A | 3/1996 | Bellegarda et al. | 382/159 |
| 5,615,296 A | 3/1997 | Stanford et al. | 395/2.1 |
| 5,621,809 A | 4/1997 | Bellegarda et al. | 382/116 |
| 5,680,511 A | 10/1997 | Baker et al. | 395/2.66 |
| 5,689,617 A | 11/1997 | Pallakoff et al. | 395/2.64 |
| 5,710,866 A | 1/1998 | Alleva et al. | 704/256 |
| 5,752,052 A | 5/1998 | Richardson et al. | 395/759 |
| 5,765,133 A | 6/1998 | Antoniol et al. | 704/355 |
| 5,819,220 A | 10/1998 | Sarukkai et al. | 704/243 |
| 5,829,000 A | 10/1998 | Huang et al. | 704/252 |
| 5,835,888 A | 11/1998 | Kanevsky et al. | 704/9 |
| 5,899,973 A | 5/1999 | Bandara et al. | 704/256 |
| 5,905,972 A | 5/1999 | Huang et al. | 704/268 |
| 5,913,193 A | 6/1999 | Huang et al. | 704/258 |
| 5,937,384 A | 8/1999 | Huang et al. | 704/256 |
| 5,963,903 A | 10/1999 | Hon et al. | 704/254 |
| 6,073,091 A | 6/2000 | Kanevsky et al. | 704/9 |
| 6,081,799 A | 6/2000 | Beavin et al. | 704/257 |
| 6,141,641 A | 10/2000 | Hwang et al. | 704/243 |
| 6,154,722 A | 11/2000 | Bellegarda | 704/257 |
| 6,157,912 A | 12/2000 | Kneser et al. | 704/270 |
| 6,167,398 A | 12/2000 | Wyard et al. | 707/5 |
| 6,182,039 B1 | 1/2001 | Rigazio et al. | 704/257 |
| 6,188,976 B1 | 2/2001 | Ramaswamy | 704/9 |
| 6,567,778 B1 * | 5/2003 | Chao Chang et al. | 704/257 |

FOREIGN PATENT DOCUMENTS

| | | |
|---|---|---|
| EP | 0 645 757 A1 | 3/1995 |
| EP | 0 687 987 A1 | 12/1995 |
| WO | WO 96/41333 | 12/1996 |
| WO | WO 98/34180 | 8/1998 |

OTHER PUBLICATIONS

Jelinek et al. "Putting Language into Language Modeling," Proceedings of Eurospeech 1999, pp. 1–5.*

(List continued on next page.)

*Primary Examiner*—Richemond Dorvil
*Assistant Examiner*—V. Paul Harper
(74) *Attorney, Agent, or Firm*—Westman, Champlin & Kelly, P.A.; Todd R. Fronek; Steve Koehler

(57) ABSTRACT

A language processing system includes a unified language model. The unified language model comprises a plurality of context-free grammars having non-terminal tokens representing semantic or syntactic concepts and terminals, and an N-gram language model having non-terminal tokens. A language processing module capable of receiving an input signal indicative of language accesses the unified language model to recognize the language. The language processing module generates hypotheses for the received language as a function of words of the unified language model and/or provides an output signal indicative of the language and at least some of the semantic or syntactic concepts contained therein.

19 Claims, 4 Drawing Sheets

OTHER PUBLICATIONS

Ward et al. "Flexible Use of Semantic Constraints in Speech Recognition," Apr. 1993, 1993 IEEE ICASSP, vol. 2, pp. 49–50.*

Souvignier et at. "The Thoughtful Elephant: Strageties for Spoken Dialog Systems," Jan. 2000, IEEE Transactions on Speech and Audio Processing, vol. 8, No. 1, pp. 51–62.*

Mergel, A. et al., "Construction of Language Models for Spoken Database Queries", IEEE, 1987, pp. 844–847.

Ward, W., "Understanding Spontaneous Speech: The Phoenix System", Proceedings ICASSP, 1991, pp. 365–367.

Matsunaga et al., "Task Adaptation in Stochastic Language Models for Continuous Speech Recognition", IEEE Mar. 23, 1992, pp. I–165–I–168.

Moore, R., et al., "Combining Linguistic and Statistical Knowledge Sources in Natural–Language Processing for ATIS", in Proceedings of the ARPA Spoken Language Systems Technology Workshop, 1995, Morgan Kaufmann, Los Altos, CA; Austin, Texas.

PJ Wyard et al., "Spoken Language Systems–Beyond Prompt and Response", BT Technology Journal, Jan. 1996, No. 1, pp. 187–205.

Huang, X., et al., "From Sphinx II to Whisper: Making Speech Recognition Usable, in Automatic Speech and Speaker Recognition", C.H. Lee, F.K. Soong, and K.K. Paliwal, Editors, 1996, Klewer Academic Publishers: Norwell, MA., pp. 481–508.

"Implications of the Perplexity Definition", Eagles Handbook of Standards and Resources for Spoken Language Systems, Online!, May 1997.

Kneser et al., "Semantic Clustering for Adaptive Language Modelling", IEEE, 1997, pp. 779–782.

Masataki et al., "Task Adaptation Using Map Estimation in N–gram Language Modeling", IEEE, 1997, pp. 783–786.

Niesler et al., "Modelling Word–Pair Relations in a Category–Based Language Model", IEEE, 1997, pp. 795–798.

Bellegarda, J., "A Statistical Language Modeling Approach Integrating Local and Global Constraints", IEEE, 1997, pp. 262–269.

Seneff, S., "The Use of Linguistic Hierarchies in Speech Understanding", in ICSLP, 1998, Sydney, Australia.

Gillett, J. and W. Ward, "A Language Model Combining Trigrams and Stochastic Context–Free Grammars", in ICSLP, 1998, Sydney, Australia.

Galescu, L., E.K. Ringger, and J. Allen, "Rapid Language Model Development for New Task Domains", in Proceedings of the ELRA First International Conference on Language Resources and Evaluation (LREC), 1998, Granada, Spain.

Nasr, A., et al., "A Language Model Combining N–grams and Stochastic Finite State Automata", in Eurospeech, 1999.

Wang, Y.–Y., "A Robust Parser for Spoken Language Understanding", in Eurospeech, 1999, Hungary.

Wang, K., "An Event Driven Model for Dialogue Systems", in ICSLP, 1998, Sydney, Australia.

Mahajan, M., D. Beeferman, and X.D. Huang, "Improved Topic–Dependent Language Modeling Using Information Retrieval Techniques", in ICASSP, 1999, Phoenix, AZ., USA.

Goodman, J.T., "Putting It All Together: Language Model Combination," Acoustics, Speech, and Signal Processing, 2000. ICASSP '00 Inern'l Conf. On, v. 3, pp. 1647–1650.

Wang, Ye–Yi et al., "Unified Context–Free Grammar and N–Gram Model for Spoken Language Processing," Acoustics, Speech, and Signal Processing, 2000 IEEE Intern'l Conf. On, v. 3, pp. 1639–1642.

Tsukada, H. et al., "Reliable Utterance Segment Recognition by Integrating a Grammar with Statistical Language Constraints," Speech Communications, Elsevier Science Publishers, Dec. 1998, vol. 26, No. 4, pp. 299–309.

Moore, R., "Using Natural–Language Knowledge Sources in Speech Recognition," Computational Models of Speech Pattern Processing, Proceedings of Computational Models of Speech Pattern Processing, Jul. 1997, pp. 304–327.

Tawezawa, T. et al., "Dialogue Speech Recognition Using Syntactic Rules Based on Subtrees and Preterminal Bigrams," Systems & Computers in Japan, Scripta Technica Journals, May 1, 1997, vol. 28, No. 5, pp. 22–32.

Hwang, M. Y., et al., "Predicting unseen Triphones with Senones," IEEE Transactions on Speech and Audio Processing, Nov. 6, 1996, pp. 412–419.

Kawabata, T., et al ., "Back–Off Method for N–Gram Smoothing Based on Binomial Posterior Distribution," Acoustics, Speech, and Signal Processing, 1996. ICASSP—96, v. 1, pp. 192–195.

Database Inspec 'Online!, Institute of Electrical Engineers, "Improvement of a Probabilistic CFG Using a Cluster–Based language Modeling Technique," & "Methodologies for the Conception, Design, and Application of Intelligent Systems," Abstract, 1996.

Huang, X, et al., "Microsoft Windows Highly Intelligent Speech Recognizer: Whisper," 1195, IEEE, pp. 93–96.

Lloyd–Thomas, H., et al., "An Integrated Grammar/Bigram Language Model Using Path Scores," Proceedings of the International Conference on Acoustics, Speech and Signal Processing, May 9, 1995, vol. 1, pp. 173–176.

Meteer, M., et al., "Statistical Language Modeling Combining N–Gram and Context–Free Grammars," Speech Processing, Mpls., Apr. 27–30, 1993, ICASSP, New York, IEEE, Apr. 27, 1993, vol. 2, pp. II–37–40.

Lippmann, E.A., et al., "Multi–Style Training for Robust Isolated–Word Speech Recognition," Proceedings of DARPA Speech Recognition Workshop, Mar. 24–26, 1987, pp. 96–99.

* cited by examiner

USE OF A UNIFIED LANGUAGE MODEL

BACKGROUND OF THE INVENTION

The present invention relates to language modeling. More particularly, the present invention relates to a language processing system utilizing a unified language model.

Accurate speech recognition requires more than just an acoustic model to select the correct word spoken by the user. In other words, if a speech recognizer must choose or determine which word has been spoken, if all words have the same likelihood of being spoken, the speech recognizer will typically perform unsatisfactorily. A language model provides a method or means of specifying which sequences of words in the vocabulary are possible, or in general provides information about the likelihood of various word sequences.

One form of a language model that has been used is a unified language model. The unified language model is actually a combination of an N-gram language model (hybrid N-gram language model) and a plurality of context-free grammars. In particular, the plurality of context-free grammars is used to define semantic or syntactic concepts of sentence structure or spoken language using non-terminal tokens to represent the semantic or syntactic concepts. Each non-terminal token is defined using at least terminals and, in some instances, other non-terminal tokens in a hierarchical structure. The hybrid N-gram language model includes at least some of the same non-terminals of the the plurality of context-free grammars embedded therein such that in addition to predicting terminals or words, the N-gram language model also can predict non-terminals.

Current implementation of the unified language model in a speech recognition system uses a conventional terminal based N-gram model to generate hypotheses for the utterance to be recognized. As is well known, during the speech recognition process, the speech recognition system will explore various hypotheses of shorter sequences of possible words, and based on probabilities obtained from the conventional terminal based N-gram model, discard those yielding lower probabilities. Longer hypotheses are formed for the utterance and initial language model scores are calculated using the conventional terminal based N-gram model.

Commonly, the language model scores are combined with the acoustic model score to provide a total score for each hypothesis. The hypotheses are then ranked from highest to lowest based on their total scores. The unified language model is then applied to each of the hypotheses, or a subset thereof, to calculate new language model scores, which are then combined with the acoustic model score to provide new total scores. The hypotheses are then re-ranked based on the new total scores, wherein the highest is considered to correspond to the utterance. However, since some hypotheses were discarded during the search process, upon recalculation of the language model scores with the unified language model, the correct hypothesis could have been discarded, and therefore, will not make it into the list of hypotheses. Use of a unified language model which has the potential to be more accurate than the conventional word-based N-gram directly during the search process can help in preventing such errors.

Although speech recognition systems have been used in the past to simply provide textual output corresponding to a spoken utterance, there is a desire to use spoken commands to perform various actions with a computer. Typically, the textual output from the speech recognition system is provided to a natural language parser, which attempts to ascertain the meaning or intent of the utterance in order to perform a particular action. This structure therefore requires creation and fine-tuning of the speech recognition system as well as creation and fine-tuning of the natural language parser, both of which can be tedious and time consuming.

There is thus a continuing need for a language processing system that addresses one or both of the problems discussed above.

SUMMARY OF THE INVENTION

A language processing system includes a unified language model. The unified language model comprises a plurality of context-free grammars having non-terminal tokens representing semantic or syntactic concepts and terminals, and an N-gram language model having non-terminal tokens in addition to the words in the language. A language processing module capable of receiving an input signal indicative of language accesses the unified language model to recognize the language. The language processing module generates hypotheses for the received language as a function of terminals of the unified language model and/or provides an output signal indicative of the language and at least some of the semantic or syntactic concepts contained therein.

DETAILED DESCRIPTION OF ILLUSTRATIVE EMBODIMENTS

Figure 1:
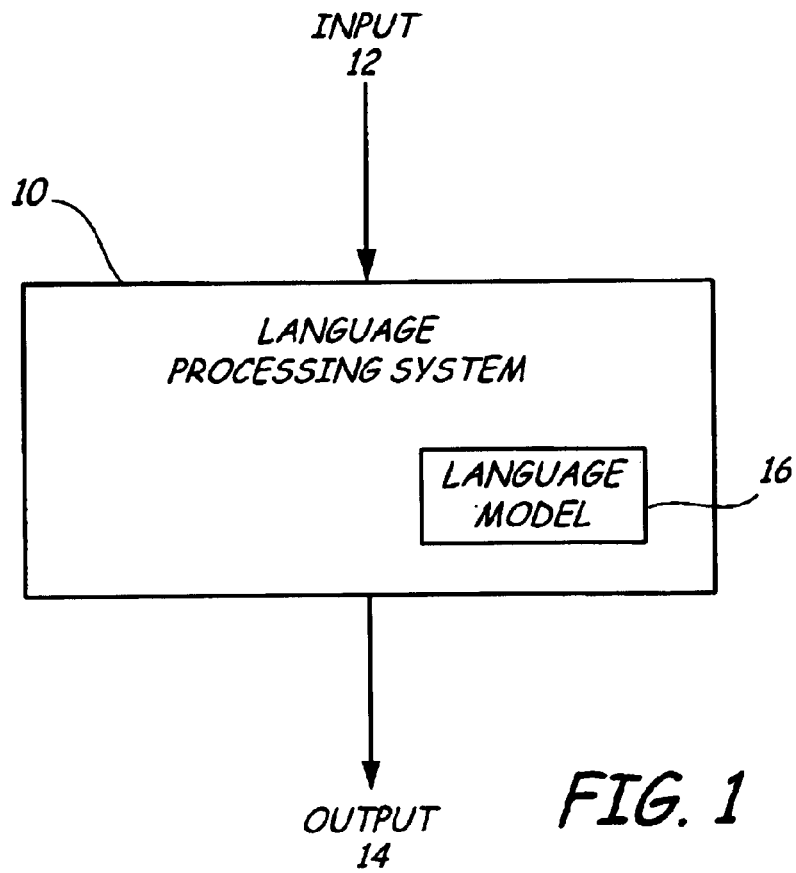
FIG. 1 is a block diagram of a language processing system.

FIG. 1 generally illustrates a language processing system 10 that receives a language input 12 and processes the language input 12 to provide a language output 14. For example, the language processing system 10 can be embodied as a speech recognition system or module that receives as the language input 12 spoken or recorded language by a user. The speech recognition system 10 processes the spoken language and provides as an output, recognized words typically in the form of a textual output.

During processing, the speech recognition system or module 10 can access a language model 16 in order to determine which words have been spoken. The language model 16 encodes a particular language, such as English. In the embodiment illustrated, the language model 16 is a unified language model comprising a context-free grammar specifying semantic or syntactic concepts with non-terminals and a hybrid N-gram model having non-terminals embedded therein.

As appreciated by those skilled in the art, the language model 16 can be used in other language processing systems besides the speech recognition system discussed above. For instance, language models of the type described above can be used in handwriting recognition, Optical Character Recognition (OCR), spell-checkers, language translation, input of Chinese or Japanese characters using standard PC keyboard, or input of English words using a telephone keypad. Although described below with particular reference to a speech recognition system, it is to be understood that the present invention is useful in application of language models in these and other forms of language processing systems.

Figure 2:
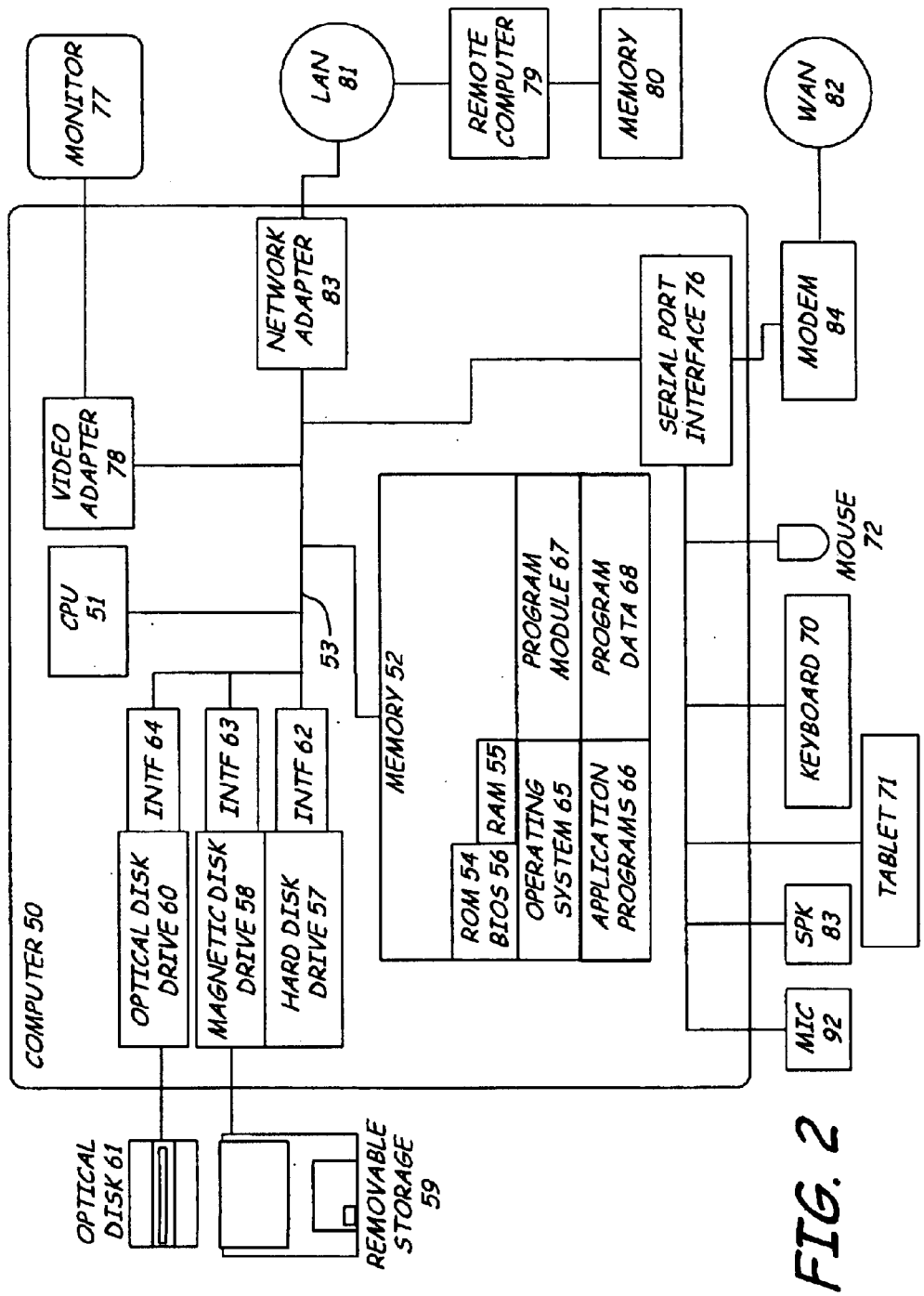
FIG. 2 is a block diagram of an exemplary computing environment.

Prior to a detailed discussion of the present invention, an overview of an operating environment may be helpful. FIG. 2 and the related discussion provide a brief, general description of a suitable computing environment in which the invention can be implemented. Although not required, the invention will be described, at least in part, in the general context of computer-executable instructions, such as program modules, being executed by a personal computer. Generally, program modules include routine programs, objects, components, data structures, etc. that perform particular tasks or implement particular abstract data types. Tasks performed by the programs and modules are described below and with the aid of block diagrams and flow charts. Those skilled in the art can implement the descriptions, block diagrams and flow charts as processor executable instructions, which can be written on any form of a computer readable medium. In addition, those skilled in the art will appreciate that the invention can be practiced with other computer system configurations, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network. In a distributed computing environment, program modules can be located in both local and remote memory storage devices.

With reference to FIG. 2, an exemplary system for implementing the invention includes a general purpose computing device in the form of a conventional personal computer 50, including a processing unit 51, a system memory 52, and a system bus 53 that couples various system components including the system memory to the processing unit 51. The system bus 53 can be any of several types of bus structures including a memory bus or memory controller, a peripheral bus, and a local bus using any of a variety of bus architectures. The system memory includes read only memory (ROM) 54 and a random access memory (RAM) 55. A basic input/output system 56 (BIOS), containing the basic routine that helps to transfer information between elements within the personal computer 50, such as during start-up, is stored in ROM 54. The personal computer 50 further includes a hard disk drive 57 for reading from and writing to a hard disk (not shown), a magnetic disk drive 58 for reading from or writing to a removable magnetic disk 59, and an optical disk drive 60 for reading from or writing to a removable optical disk such as a CD ROM or other optical media. The hard disk drive 57, magnetic disk drive 58, and optical disk drive 60 are connected to the system bus 53 by a hard disk drive interface 62, magnetic disk drive interface 63, and an optical drive interface 64, respectively. The drives and the associated computer-readable media provide nonvolatile storage of computer readable instructions, data structures, program modules and other data for the personal computer 50.

Although the exemplary environment described herein employs the hard disk, the removable magnetic disk 59 and the removable optical disk 61, it should be appreciated by those skilled in the art that other types of computer readable media, which can store data that is accessible by a computer, such as magnetic cassettes, flash memory cards, digital video disks, Bernoulli cartridges, random access memories (RAMs), read only memory (ROM), and the like, can also be used in the exemplary operating environment.

A number of program modules can be stored on the hard disk, magnetic disk 59, optical disk 61, ROM 54 or RAM 55, including an operating system 65, one or more application programs 66, other program modules 67, and program data 68. A user can enter commands and information into the personal computer 50 through input devices such as a keyboard 70, a handwriting tablet 71, a pointing device 72 and a microphone 92. Other input devices (not shown) can include a joystick, game pad, satellite dish, scanner, or the like. These and other input devices are often connected to the processing unit 51 through a serial port interface 76 that is coupled to the system bus 53, but can be connected by other interfaces, such as a sound card, a parallel port, a game port or a universal serial bus (USB). A monitor 77 or other type of display device is also connected to the system bus 53 via an interface, such as a video adapter 78. In addition to the monitor 77, personal computers typically include other peripheral output devices such as a speaker 83 and a printer (not shown).

The personal computer 50 can operate in a networked environment using logic connections to one or more remote computers, such as a remote computer 79. The remote computer 79 can be another personal computer, a server, a router, a network PC, a peer device or other network node, and typically includes many or all of the elements described above relative to the personal computer 50, although only a memory storage device 80 has been illustrated in FIG. 2. The logic connections depicted in FIG. 2 include a local area network (LAN) 81 and a wide area network (WAN) 82. Such networking environments are commonplace in offices, enterprise-wide computer network Intranets and the Internet.

When used in a LAN networking environment, the personal computer 50 is connected to the local area network 81 through a network interface or adapter 83. When used in a WAN networking environment, the personal computer 50 typically includes a modem 84 or other means for establishing communications over the wide area network 82, such as the Internet. The modem 84, which can be internal or external, is connected to the system bus 53 via the serial port interface 76. In a network environment, program modules depicted relative to the personal computer 50, or portions thereof, can be stored in the remote memory storage devices. As appreciated by those skilled in the art, the network connections shown are exemplary and other means of establishing a communications link between the computers can be used.

Figure 3:
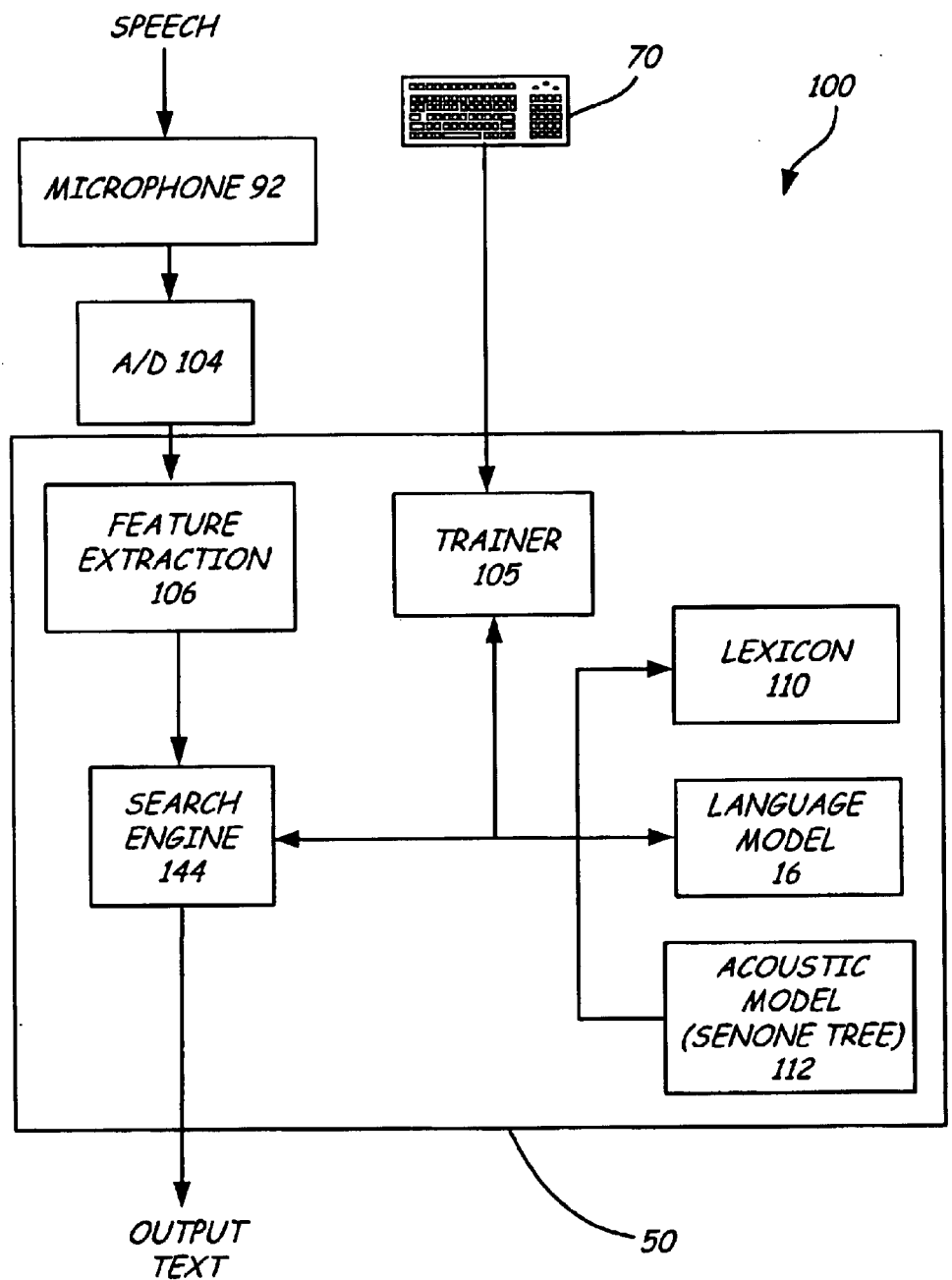
FIG. 3 is a block diagram of an exemplary speech recognition system.

An exemplary embodiment of a speech recognition system 100 is illustrated in FIG. 3. The speech recognition system 100 includes the microphone 92, an analog-to-digital (A/D) converter 104, a training module 105, feature extraction module 106, a lexicon storage module 110, an acoustic model along with senone trees 112, a tree search engine 114, and the language model 16. It should be noted that the entire system 100, or part of speech recognition system 100, can be implemented in the environment illustrated in FIG. 2. For example, microphone 92 can preferably be provided as an input device to the computer 50, through an appropriate interface, and through the A/D converter 104. The training module 105 and feature extraction module 106 can be either hardware modules in the computer 50, or software modules stored in any of the information storage devices disclosed in FIG. 2 and accessible by the processing unit 51 or another suitable processor. In addition, the lexicon storage module 110, the acoustic model 112, and the language model 16 are also preferably stored in any of the memory devices shown in FIG. 2. Furthermore, the tree search engine 114 is implemented in processing unit 51 (which can include one or more processors) or can be performed by a dedicated speech recognition processor employed by the personal computer 50.

In the embodiment illustrated, during speech recognition, speech is provided as an input into the system 100 in the form of an audible voice signal by the user to the microphone 92. The microphone 92 converts the audible speech signal into an analog electronic signal, which is provided to the A/D converter 104. The A/D converter 104 converts the analog speech signal into a sequence of digital signals, which is provided to the feature extraction module 106. In one embodiment, the feature extraction module 106 is a conventional array processor that performs spectral analysis on the digital signals and computes a magnitude value for each frequency band of a frequency spectrum. The signals are, in one illustrative embodiment, provided to the feature extraction module 106 by the A/D converter 104 at a sample rate of approximately 16 kHz.

The feature extraction module 106 divides the digital signal received from the A/D converter 104 into frames that include a plurality of digital samples. Each frame is approximately 10 milliseconds in duration. The frames are then encoded by the feature extraction module 106 into a feature vector reflecting the spectral characteristics for a plurality of frequency bands. In the case of discrete and semi-continuous Hidden Markov Modeling, the feature extraction module 106 also encodes the feature vectors into one or more code words using vector quantization techniques and a codebook derived from training data. Thus, the feature extraction module 106 provides, at its output the feature vectors (or code words) for each spoken utterance. The feature extraction module 106 provides the feature vectors (or code words) at a rate of one feature vector or (code word) approximately every 10 milliseconds.

Output probability distributions are then computed against Hidden Markov Models using the feature vector (or code words) of the particular frame being analyzed. These probability distributions are later used in executing a Viterbi or similar type of processing technique.

Upon receiving the code words from the feature extraction module 106, the tree search engine 114 accesses information stored in the acoustic model 112. The model 112 stores acoustic models, such as Hidden Markov Models, which represent speech units to be detected by the speech recognition system 100. In one embodiment, the acoustic model 112 includes a senone tree associated with each Markov state in a Hidden Markov Model. The Hidden Markov models represent, in one illustrative embodiment, phonemes. Based upon the senones in the acoustic model 112, the tree search engine 114 determines the most likely phonemes represented by the feature vectors (or code words) received from the feature extraction module 106, and hence representative of the utterance received from the user of the system.

The tree search engine 114 also accesses the lexicon stored in module 110. The information received by the tree search engine 114 based on its accessing of the acoustic model 112 is used in searching the lexicon storage module 110 to determine a word that most likely represents the codewords or feature vector received from the features extraction module 106. Also, the search engine 114 accesses the language model 16, The language model 16 is a unified language model that is used in identifying the most likely word represented by the input speech. The most likely word is provided as output text.

Although described herein where the speech recognition system 100 uses HMM modeling and senone trees, it should be understood that this is but one illustrative embodiment. As appreciated by those skilled in the art, the speech recognition system 100 can take many forms and all that is required is that it uses the language model 16 and provides as an output the text spoken by the user.

As is well known, a statistical N-gram language model produces a probability estimate for a word given the word sequence up to that word (i.e., given the word history H). An N-gram language model considers only (n–1) prior words in the history H as having any influence on the probability of the next word. For example, a bi-gram (or 2-gram) language model considers the previous word as having an influence on the next word. Therefore, in an N-gram language model, the probability of a word occurring is represented as follows:

$$P(w/H) = P(w/w1, w2, \ldots w(n-1)) \tag{1}$$

where w is a word of interest:

w1 is the word located n–1 positions prior to the word w;

w2 is the word located n–2 positions prior to the word w; and w(n–1) is the first word prior to word w in the sequence.

Also, the probability of a word sequence is determined based on the multiplication of the probability of each word given its history. Therefore, the probability of a word sequence (w1 . . . wm) is represented as follows:

$$P(w1\ldots wm) = \prod_{i=1}^{m} (P(w_i/H_i)) \tag{2}$$

The N-gram model is obtained by applying an N-gram algorithm to a corpus (a collection of phrases, sentences, sentence fragments, paragraphs, etc) of textual training data. An N-gram algorithm may use, for instance, known statistical techniques such as Katz's technique, or the binomial posterior distribution backoff technique. In using these techniques, the algorithm estimates the probability that a word w(n) will follow a sequence of words w1, w2, . . . w(n–1). These probability values collectively form the N-gram language model.

As also well known in the art, a language model can also comprise a context-free grammar. A context-free grammar provides a rule-based model that can capture semantic or syntactic concepts (e.g. an action, a subject, an object, etc.) of sentence structure or spoken language.

For instance, by way of example, one set of context-free grammars of a larger plurality of context-free grammars for a software application or task concerning scheduling meetings or sending electronic mail may comprise:

<Schedule Meeting>→<Schedule Command><Meeting Object>;

<Schedule Command>→book;

<Schedule Command>→schedule;

<Schedule Command>→arrange;

etc.

<Meeting Object>→meeting;

<Meeting Object>→dinner;

<Meeting Object>→appointment;

<Meeting Object>→a meeting with <Person>;

<Meeting Object>→a lunch with <Person>;

etc.

<Person>→Anne Weber;

<Person>→Eric Moe;

<Person>→Paul Toman;

etc.

In this example, "< >" denote non-terminals for classifying semantic or syntactic concepts, whereas each of the non-terminals is defined using terminals (e.g. words or phrases) and, in some instances, other non-terminal tokens in a hierarchical structure.

This type of grammar does not require an in-depth knowledge of formal sentence structure or linguistics, but rather, a knowledge of what words, phrases, senstences or sentence fragments are used in a particular application or task.

Figure 4:
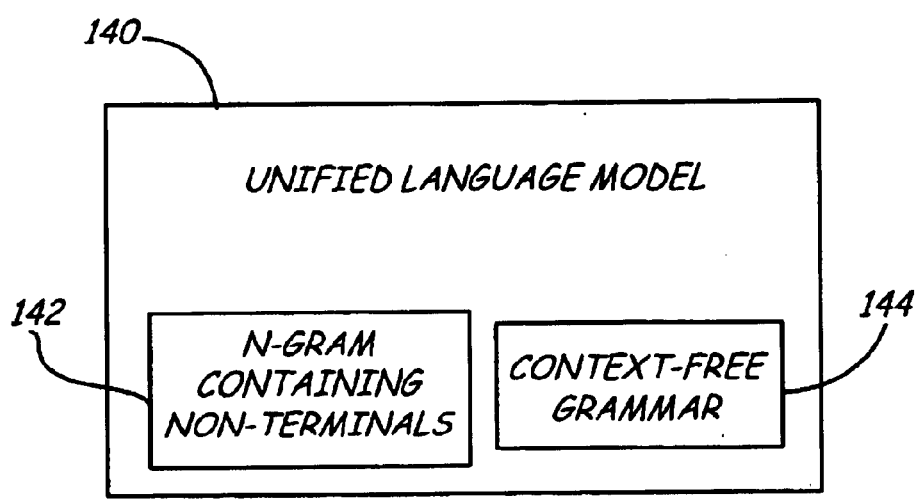
FIG. 4 is a pictorial representation of a unified language model.

A unified language model is also well known in the art. Referring to FIG. 4, a unified language model 140 includes a combination of an N-gram language model 142 and a plurality of context-free grammars 144. Specifically, the N-gram language model 142 includes at least some of the same non-terminals of the plurality of context-free grammars 144 embedded therein such that in addition to predicting words, the N-gram language model 142 also can predict non-terminals. Generally, a probability for a non-terminal can be represented by the following:

$$P(<NT>/h1, h2, \ldots hn) \quad (3)$$

where (h1, h2, . . . hn) can be previous words or non-terminals. Essentially, the N-gram language model 142 (also known as a hybrid N-gram model) of the unified language model 140 includes an augmented vocabulary having words and at least some of the non-terminals. The manner in which the unified language model is created is not essential to the present invention. However, co-pending application entitled "Creating a Language Model for a Language Processing System", filed on Jun. 1, 2000 and assigned Ser. No. 09/585,298 describes various techniques for creating a unified language model and is incorportated herein by reference in its entirety.

In use, the speech recognition system or module 100 will access the language model 16 (in this embodiment, the unified language model 140) in order to determine which words have been spoken. The N-gram language model 142 will be used to predict words and non-terminals. If a non-terminal has been predicted, the plurality of context-free grammars 144 is used to predict terminals as a function of the non-terminal. Generally, the speech recognition module 100 will use the terminals provided by the context-free grammars during the search process to expand the number of hypotheses examined.

For instance, in the context-free grammar example provided above, the speech recognition module 100 could have a hypothesis that includes " . . . a meeting with <Person>". Upon application of the non-terminal <Person> during the search process, each of the individuals defined by the context-free grammars associated with <Person> will be explored. Probabilities associated with each of the terminals for the non-terminal <Person> will be applied with probabilities of the terminals from the hybrid N-gram model in order to assign a probability for each sequence of words (hypothesis) that is explored. The competing scores for each language model hypothesis are typically combined with scores from the acoustic model in order to form an N-best list of possible hypotheses for the sequence of words. However, the manner in which the language model score for each hypothesis is used is not an essential aspect of this portion of the invention.

In one embodiment, an input utterance $W=w_1 w_2 \ldots w_s$ can be segmented into a sequence $T=t_1 t_2 \ldots t_m$ where each $t_i$ is either a word in W or a context-free grammar non-terminal that covers a sequence of words $\overline{u}_{t_i}$ in W. The likelihood of W under the segmentation T is therefore $$P(W, T) = \prod_{i=1}^{m} P(t_i|t_{i-2}, t_{i-1}) \prod_{i=1}^{m} P(\overline{u_{t_i}}|t_i) \quad (4)$$

In addition to tri-gram probabilities, we need to include $P(\overline{ut}_i|t_i)$, the likelihood of generating a word sequence $\overline{u}_{t_i}=[u_{t_i 1} u_{t_i 2} \ldots u_{t_i k}]$ from the context-free grammar non-terminal $t_i$. In the case when $t_i$ itself is a word $(\overline{u}_{t_i}=[t_i])$, $P(\overline{u}_{t_i}|t_i)=1$. Otherwise, $P(\overline{u}_{t_i}|t_i)$ can be obtained by predicating each word in the sequence on its word history:

$$P(\overline{u_{t_i}}|t_i) = \left[\prod_{l=1}^{\|\overline{u}_{t_i}\|} P(u_{t_i l}|u_{t_i 1}, \ldots, u_{t_i l-1})\right] P(</s>|\overline{u_{t_i}}) \quad (5)$$

Here </s> represents the special end-of-sentence word. Three different methods are used to calculate the likelihood of a word given history inside a context-free grammar non-terminal.

A history $h=u_{t_i 1} u_{t_i 2} \ldots u_{t_i l-1}$ corresponds to a set $Q(h)$, where each element in the set is a CFG state generating the initial l−1 words in the history from the non-terminal $t_i$. A CFG state constrains the possible words that can follow the history. The union of the word sets for all of the CFG states in Q(h), $W_Q(h)$ defines all legal words (including the symbol "</s>") for exiting the non-terminal $t_i$ if $$t_i \overset{*}{\Rightarrow} u_{t_i 1} u_{t_i 2} \ldots u_{t_i l-1})$$

that can follow the history according to the context-free grammar constraints. The likelihood of observing $u_{t_i l}$ following the history can be estimated by the uniform distribution below:

$$P(u_{t_i l}|h)=1/\|W_Q(h)\|. \quad (6)$$

The uniform model does not capture the empirical word distribution underneath a context-free grammar non-terminal. A better alternative is to inherit existing domain-independent word tri-gram probabilities. These probabilities need to be appropriately normalized in the same probability space. Even though, we have used word tri-gram models to illustrate the technique, it should be noted that any word-based language model can be used here including word-level N-grams with different N. Also, the technique is applicable irrespective of how the word language models are trained (in particular whether task-independent or task-dependent corpus is used). Thus we have:

$$P(u_{t_i l}|h) = \frac{P_{word}(u_{t_i l}|u_{t_i l-2}, u_{t_i l-1})}{\sum_{w \in W_Q(h)} P_{word}(w|u_{t_i l-2}, u_{t_i l-1})} \quad (7)$$

Another way to improve the modeling of word sequence covered by a specific CFG non-terminal is to use a specific word tri-gram language model $P_t(w_n|w_{n-2},w_{n-1})$ for each non-terminal t. The normalization is performed the same as in Equation (7).

Multiple segmentations may be available for W due to the ambiguity of natural language. The likelihood of W is therefore the sum over all segmentations S(W):

$$P(w) = \sum_{T \in S(W)} P(W, T) \quad (8)$$

Another aspect of the present invention includes using the unified language model as an aid in spoken language understanding. Although speech recognition commonly provides an output signal, typically textual, indicative of the words spoken by the user, it is often desirable to ascertain the intent or meaning of what has been spoken in order that an action can be taken by the computer. The latter analysis comprises spoken language understanding. Commonly, prior art systems provide the textual output of a speech recognizer to a natural language parser, which attempts to ascertain what has been spoken. It has been discovered that the speech recognition module can use the unified language model in a manner so as to provide additional information for spoken language understanding.

Generally, for a selected application, actions to be performed by the application can be classified as "topic identification". For instance, topic identifications of an electronic mail program could include sending an electronic mail, forwarding an electronic mail, replying to an electronic mail, adding an entry to an address book, etc. Each topic identification includes specific information (herein referred to "slots"). For instance, a simple spoken instruction such as "Send an e-mail to Peter about lunch" pertains to the topic identification of "Sending an electronic mail" wherein a "recipient" slot is "Peter" and a "topic" slot is "lunch".

Figures 5, 6:
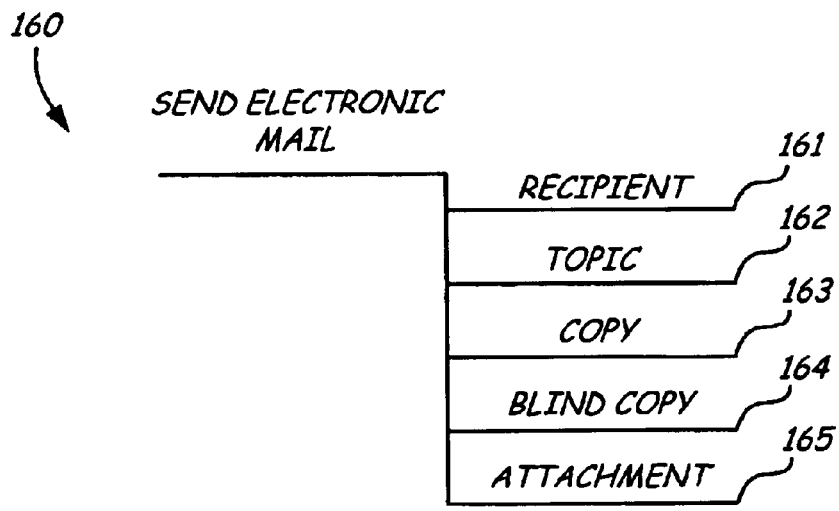
FIG. 5 is pictorial representation of a topic identification and corresponding slots.
FIG. 6 is a user interface for an electronic mail application.

FIG. 5 is a pictorial representation of the aforementioned example wherein the topic identification 160 comprises slots 161, 162, 163, 164 and 165. As appreciated by those skilled in the art, additional information may be present in each topic identification. For example, in the aforementioned example, additional slots could include a "copy" slot 163, "blind copy" 164 and an "attachment" slot 165. This example is merely illustrative and should not be considered limiting.

In this aspect of the present invention, each of the slots can form semantic or syntactic concepts in which a context-free grammar is written or otherwise provided. A non-terminal token of the context-free grammar represents each of the terminals and other non-terminals contained therein. It should be noted that non-terminal tokens can also be provided for each of the topic identifications as well. In other words, the context-free grammar can be a complete listing of all topic identifications and all slots present in the topic identifications for actions that can be taken by a selected application.

In use, the speech recognition system or module 100 will access the unified language model 140 in order to determine which words have been spoken. The N-gram language model 142 will be used to predict words and non-terminals. If a non-terminal has been predicted, the plurality of context-free grammars 144 is used to predict terminals as a function of the non-terminals. In addition to the textual output from the speech recognition system 100 providing each of the words as spoken, the speech recognition system 100 can also indicate which context-free grammars were used and provide an indication as to slots present in the spoken phrase. Specifically, the textual output can include the non-terminal token representing the semantic concept for the words present in the textual output. In the example above, a textual output could be of the form:

<<Send electronic mail|Send e-mail> to <Recipient |Peter> about <Topic |lunch>>.

In this example, the outer most "< >" denote the topic identification 160, while inner "< >" denote slots 161 and 162 of the topic identification 160. Terminals such as "to" and "about" are provided separately in the textual output from the hybrid N-gram model 142 whereas terminals obtained from the corresponding context-free grammars 144 such as "Peter" and "lunch" are set off as provided above. It should be understood that this example is merely illustrative of one form in which the textual output from the speech recognition system can be provided. In this example, topic identification and slot information is embedded in the textual output. Those skilled in the art can appreciate that other forms can be provided. For instance, a first textual output can be for just terminals and a second output can indicate which terminals correspond to each respective slot. In other words, the form of the textual output from the speech recognition system is not essential to this aspect of the present invention. Rather, the output of the speech recognition system 100 should include indications of which terminals were believed spoken and which context-free grammars were used in ascertaining at least some of the terminals.

Recognizer can use unified language model as shown in Equation (4) to search for the word sequence and the associated segmentation which has the highest score. The segmentation contains the needed information. This information can be used by the selected application directly in taking a particular action, or this information along with the terminals forming the textual output can be provided to a natural language parser for further analysis before an action is taken by the selected application.

For instance, FIG. 6 illustrates a user interface 180 for an electronic mail program or application. Upon receipt of the output from the speech recognition system 100, the electronic mail program can initiate a "send electronic mail" action with display of interface in view of the "<Send electronic mail>" topic identification provided by the speech recognition module. The electronic mail program can also display in a "To:" field 181 "Peter" and in a "Subject:" field 182 "lunch". Each of these fields was previously associated with the non-terminal tokens in the plurality of context-free grammars 144. Therefore, identification of the non-terminal tokens in the textual output allows the electronic mail program to fill in the corresponding fields. As appreciated by those skilled in the art, the application need not use all of the non-terminal tokens provided in the textual output, nor must the application provide a user interface upon receipt of the textual output. In some applications, an action may be taken by the computer simply upon receipt of the textual output and without any further action by the user.

Although the present invention has been described with reference to preferred embodiments, workers skilled in the art will recognize that changes may be made in form and detail without departing from the spirit and scope of the invention.

What is claimed:

1. A language processing system comprising:
   a unified language model comprising:
      a plurality of context-free grammars comprising non-terminal tokens representing semantic or syntactic concepts and terminals, wherein each of the terminals include a probability value assigned by using non-uniform probability values derived from a terminal based language model and normalizing said values using the set of terminals constrained by the plurality of context-free grammars; and
      a N-gram language model having the non-terminal tokens; and
   a language processing module capable of receiving an input signal indicative of language and accessing the unified language model to recognize the language and predict non-terminal tokens contained therein, the language processing module further generating hypotheses for the received language as a function of words in the unified language model corresponding to the non-terminal tokens predicted and calculating a language model score for each of the hypotheses using the associated probability value for each terminal present therein and obtained from the plurality of context-free grammars.

2. The language processing system of claim 1 wherein the language processing module provides an output signal indicative of the language and at least some of the semantic or syntactic concepts contained therein.

3. A method for recognizing language and providing an output signal indicative thereof, the method comprising:
   receiving an input signal indicative of language;
   accessing a unified language model to recognize the language and predict non-terminal tokens contained therein, the unified language model comprising a plurality of context-free grammars comprising non-terminal tokens representing semantic or syntactic concepts and terminals, and a N-gram language model having the non-terminal tokens; and generating hypotheses for the language by exploring each of the terminals in the unified language model associated with the non-terminal tokens predicted based on a probability value for each terminal, wherein at least one terminal has a different probability value than one other terminal in the same context-free grammar.

4. The method of claim 3 wherein each of the terminals of the plurality of context-free grammars include a probability value, and wherein the method further comprises calculating a language model score for each of the hypotheses using the associated probability value for each terminal present therein and obtained from the plurality of context-free grammars.

5. The method of claim 4 and further comprising:
assigning probability values of at least some of the terminals of the context-free grammars from a terminal-based language model and normalizing said values using the set of terminals constrained by the context-free grammars.

6. The method of claim 3 and further comprising:
providing an output signal indicative of the language and at least some of the semantic or syntactic concepts contained therein.

7. A computer readable medium including instructions readable by a computer which, when implemented execute a method to perform language processing, the method comprising:

receiving an input signal indicative of language;

accessing a unified language model to recognize the language and predict non-terminal tokens contained therein, the unified language model comprising a plurality of context-free grammars comprising non-terminal tokens representing semantic or syntactic concepts and terminals wherein each of the terminals of the plurality of context-free grammars include a probability value, and a N-gram language model having the non-terminal tokens;

assigning probability values of at least some of the terminals of the context-free grammars from a terminal-based language model, wherein at least one terminal has a probability value different than one other terminal in the same context-free grammar and normalizing said values using the set of terminals constrained by the context-free grammars;

generating hypotheses for the language as a function of words in the unified language model corresponding to the non-terminal tokens predicted; and calculating a language model score for each of the hypotheses using the associated probability value for each terminal present therein and obtained from the plurality of context-free grammars.

8. The computer readable medium of claim 7 and further comprising:
providing an output signal indicative of the language and at least some of the semantic or syntactic concepts contained therein.

9. A language processing system comprising:
a unified language model comprising:
a topic identification context-free grammar comprising non-terminal tokens representing semantic or syntactic concepts related to actions to be performed using slots and a plurality of informational context-free grammars associated with the slots of the topic identification context-free grammar, each informational context-free grammar having terminals associated with a slot; and a N-gram language model having the non-terminal tokens; and a language processing module capable of receiving an input signal indicative of language and accessing the unified language model to recognize the language and predict an action associated with the topic identification context-free grammar and a terminal associated with one of the slots, the language processing module providing an output signal indicative of the language, the action and an indication of the informational context-free grammar having the terminal associated with one of the slots.

10. The language processing system of claim 9 wherein information of the output signal indicative of at least some of the semantic or syntactic concepts includes information indicative of the non-terminals.

11. The language processing system of claim 9 wherein the semantic or syntactic concepts relate to at least one of an action, a subject and an object.

12. The language processing system of claim 9 wherein the output signal comprises terminals and non-terminal tokens embedded therein.

13. The language processing system of claim 9 wherein the output signal comprises a first output signal comprising terminals of the language and a second output signal comprising non-terminals tokens indicating terminals of the first output signal indicative of semantic or syntactic concepts.

14. A method for recognizing language and providing an output signal indicative thereof, the method comprising:

receiving an input signal indicative of language;

accessing a unified language model to recognize the language and predict non-terminal tokens contained therein, the unified language model comprising a plurality of related context-free grammars comprising non-terminal tokens representing semantic or syntactic concepts and terminals, the plurality of related context-free grammars arranged in a hierarchical structure such that some of the non-terminal tokens of at least one of the plurality of the related context-free grammars are defined by another of the plurality of related context-free grammars and a N-gram language model having the non-terminal tokens; and providing an output signal indicative of the language and an indication of the plurality of related context-free grammars used in recognizing the language, wherein one of the used context-free grammars has a non-terminal token defined by another of the used context-free grammars.

15. The method of claim 14 wherein information of the output signal indicative of at least some of the semantic or syntactic concepts includes information indicative of the non-terminals.

16. The method of claim 14 wherein the semantic or syntactic concepts relate to at least one of an action, a subject and an object.

17. A computer readable medium including instructions readable by a computer which, when implemented execute a method to perform language processing, the method comprising:

receiving an input signal indicative of language;

accessing a unified language model to recognize the language and predict non-terminal tokens contained therein, the unified language model comprising:

a plurality of context-free grammars comprising non-terminal tokens representing semantic or syntactic concepts and terminals, wherein some of the non-terminal tokens correspond to actions having a plurality of slots corresponding to information related to the action, the slots being defined by other context-free grammars; and a N-gram language model having the non-terminal tokens; and providing an output signal indicative of the language, one of the actions and information corresponding to the action that is associated with one of the plurality of slots.

18. The computer readable medium of claim 17 wherein information of the output signal indicative of at least some of the semantic or syntactic concepts includes information indicative of the non-terminals.

19. The computer readable medium of claim 17 wherein the semantic or syntactic concepts relate to at least one of an action, a subject and an object.

* * * * *